(12) United States Patent
Eungard et al.

(10) Patent No.: US 6,431,252 B1
(45) Date of Patent: Aug. 13, 2002

(54) CURTAIN FOR A VEHICLE SHELTER AND METHOD FOR MAKING THE SAME

(75) Inventors: William C. Eungard, Waterford; Ronald T. Strobel, South Milwaukee, both of WI (US)

(73) Assignee: Kelley Company, Inc., Milwaukee, WI (US)

( * ) Notice: Subject to any disclaimer, the term of this patent is extended or adjusted under 35 U.S.C. 154(b) by 0 days.

(21) Appl. No.: 09/457,956

(22) Filed: Dec. 9, 1999

(51) Int. Cl.⁷ .......................... A47H 23/00; E06B 9/00; B32B 7/08
(52) U.S. Cl. ................ 160/330; 52/173.2; 112/417; 112/475.06; 112/475.08
(58) Field of Search .................. 160/330, 264; 52/173.2, 745.16, 745.15, 745.19, 745.2; 112/475.06, 475.08, 402, 417, 429

(56) References Cited

U.S. PATENT DOCUMENTS

| | | | | |
|---|---|---|---|---|
| 3,696,771 A | * | 10/1972 | Ambrose | 112/417 |
| 4,873,800 A | * | 10/1989 | Frommelt et al. | 52/173.2 |
| 5,027,729 A | * | 7/1991 | Airaksinen | 112/475.06 |
| 5,466,030 A | * | 11/1995 | Harris et al. | 296/98 |
| 5,572,941 A | * | 11/1996 | Arnos | 112/475.08 |
| 5,823,128 A | * | 10/1998 | Lapidus | 112/475.06 |
| 5,988,254 A | * | 11/1999 | Hanright | 160/264 |
| RE36,636 E | * | 4/2000 | Sturm et al. | 112/417 |

* cited by examiner

*Primary Examiner*—Michael Safavi
(74) *Attorney, Agent, or Firm*—Baker & Hostetler LLP

(57) ABSTRACT

A curtain for a dock shelter that is easily assembled alone and as part of a dock shelter. The curtain includes a sheet that has a pocket mounted thereon. The pocket is adapted to receive a flexible stay and include a slit that inhibits movement of the stay within the pocket. In another aspect, the invention relates to a method of making a curtain. The method includes the steps of securing a pocket to a sheet; forming a slit in the pocket (e.g., by cutting the pocket); inserting a flexible stay into the pocket; and positioning the stay adjacent to the slit. The invention also relates to a method of making a vehicle shelter and mounting the shelter to a loading dock. The method includes the steps of mounting a frame to the loading dock; securing a pocket to a curtain; forming slits in the pocket; inserting a stay in the pocket adjacent to the slit; and placing the curtain against the frame.

8 Claims, 5 Drawing Sheets

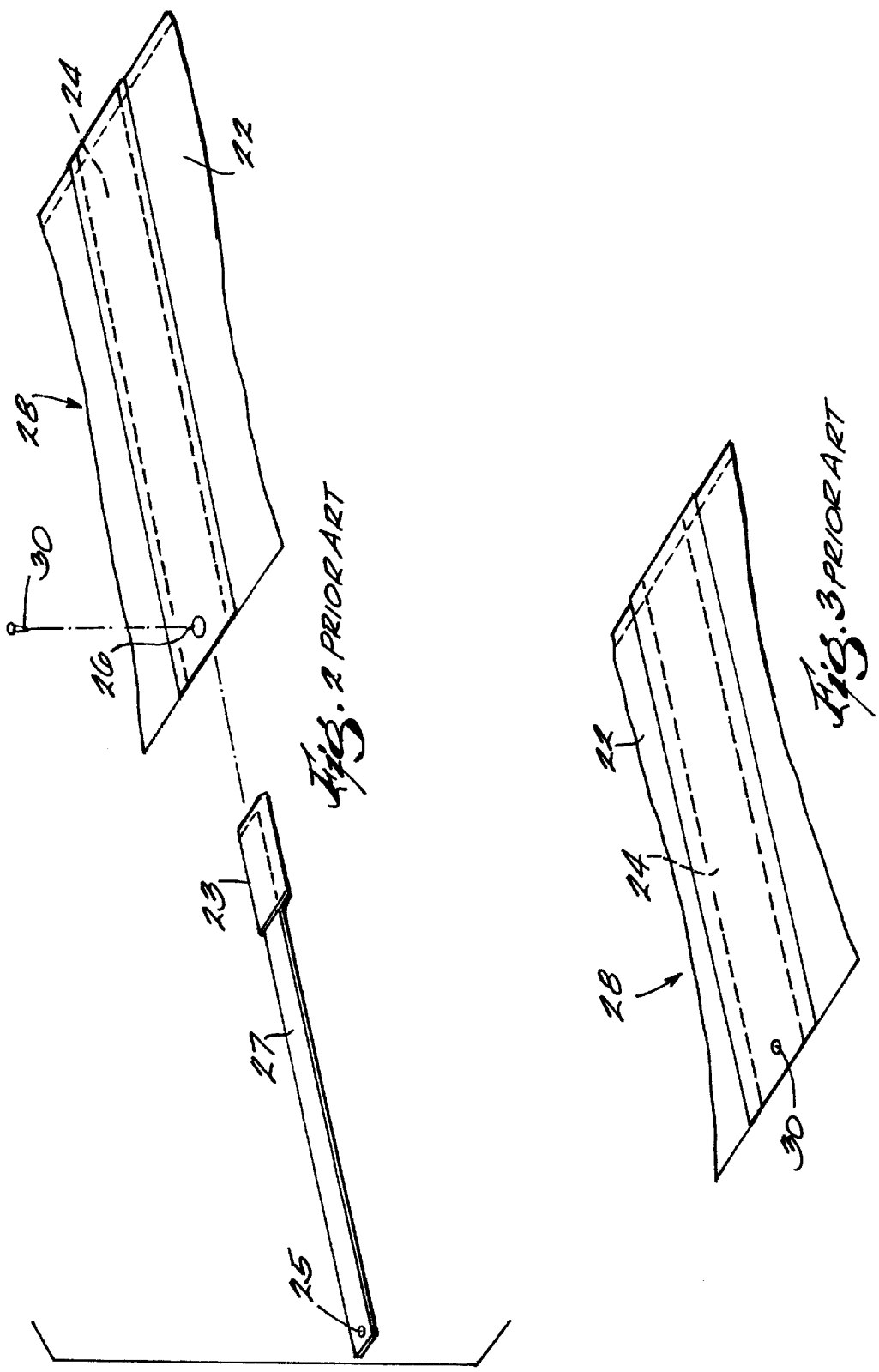

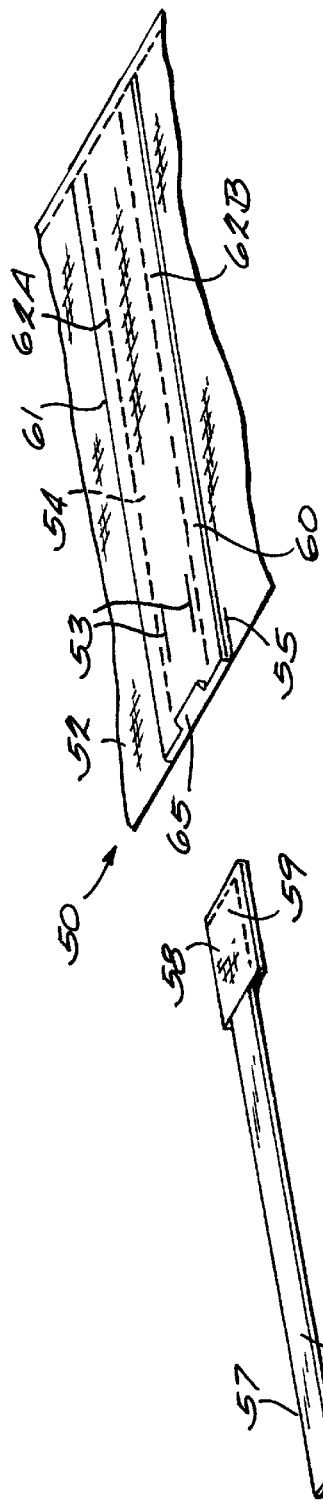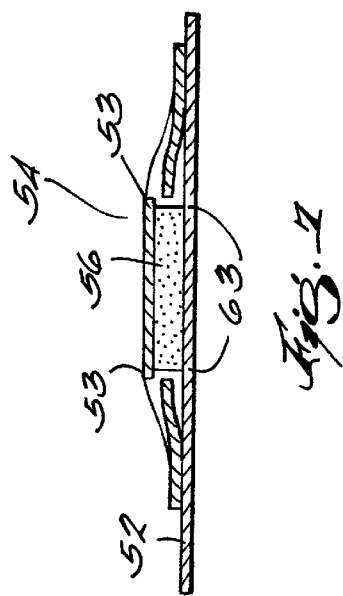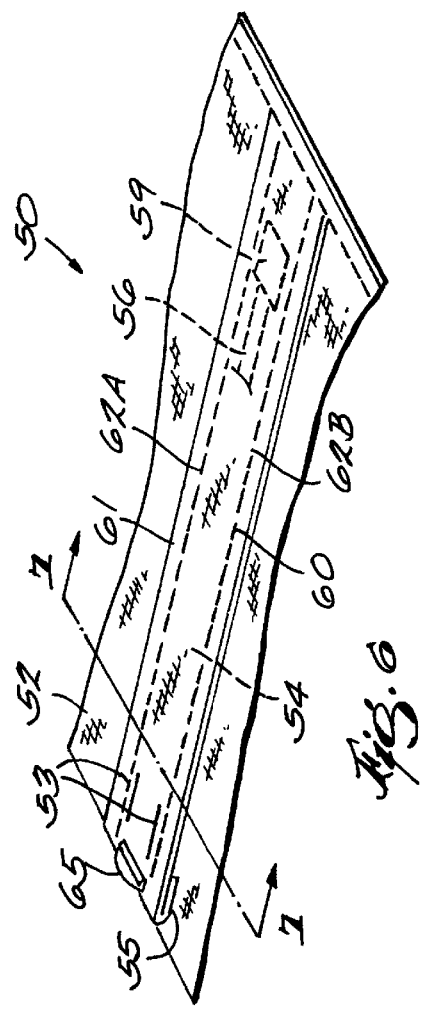

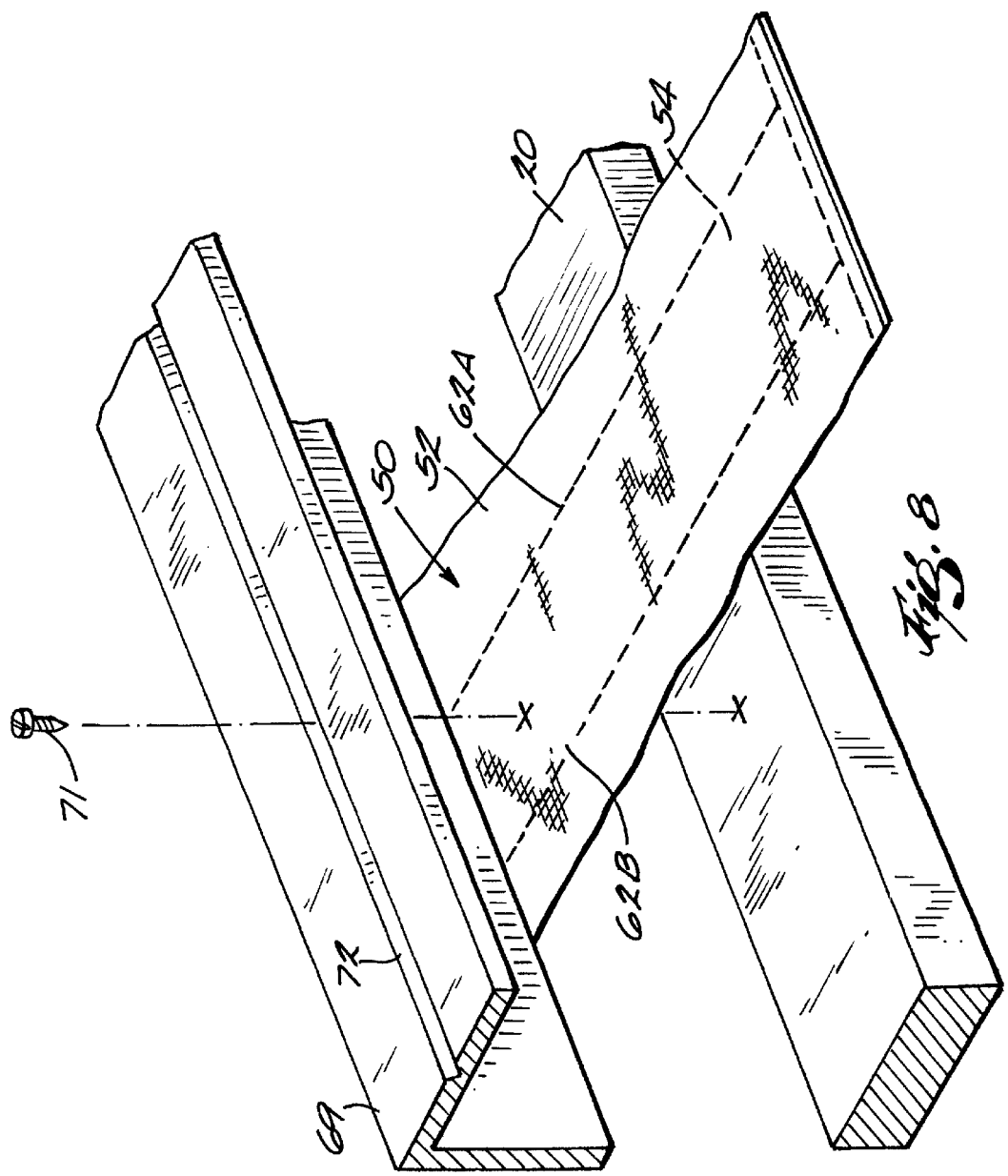

CURTAIN FOR A VEHICLE SHELTER AND METHOD FOR MAKING THE SAME

FIELD OF THE INVENTION

The present invention generally relates to the field of loading docks, and more specifically to loading dock shelters that are positioned around a loading dock opening to provide a shelter between the loading dock and the open end of a vehicle (e.g., a truck or trailer).

BACKGROUND OF THE INVENTION

Most warehouses, manufacturing facilities and large retail stores include loading docks that provide a location for loading and unloading vehicles. Loading docks typically include a raised platform and a dock opening positioned above the raised platform. The dock opening is formed by a dock wall having two vertical side portions extending upwardly from the platform, and a horizontal upper portion connecting the top of the side portions. A vehicle can back toward the dock opening until the back of the vehicle is abutting the platform. The platform sometimes includes a dockleveler that provides a ramp between the platform and the bed of the vehicle to facilitate loading and unloading of the vehicle (e.g., by a forklift).

Many loading docks include dock seals and shelters that provide a barrier between the dock wall and the back of the vehicle. For example, dock shelters can include rigid frame shelters that are made from wood or steel tubing. The rigid frame typically includes a head frame positioned above the dock opening and side frames positioned on opposing sides of the dock opening. Fiberglass panels or flexible fabric covers the frames. In addition, a head curtain and side curtains with flexible stays are positioned in front of the frames and are designed to contact the vehicle to provide a barrier between the inside of the loading dock and the exterior environment.

The above-described dock shelters provide good protection against the elements. However, as with most loading dock equipment, it must withstand repeated uses under a variety of weather and loading conditions. Any increase in longevity of the dock shelters would therefore be an improvement. In addition, simplified construction techniques and improved structural stability are desirable design goals.

A typical dock shelter 10 is illustrated in FIG. 1. The dock shelter 10 includes a frame 20 that is adapted to be mounted to a loading dock 12. The dock shelter 10 further includes a head curtain 26 that hangs from a top portion of the frame 20, and side curtains 28 that extend inwardly from respective side portions of the frame 20. The head curtain 26 and the side curtains 28 typically include flexible stays (not visible in FIG. 1) which add resiliency to the curtains to maintain a biased contact with different sized vehicles when the vehicles are positioned at the loading dock.

Referring now particularly to FIGS. 2 and 3, the curtains 28 are typically pre-assembled before they are shipped to the site of loading dock. A typical curtain 28 includes a weatherproof sheet 22 that has several pockets 24 mounted in uniform spaced parallel relation along the length of the sheet 22 (spacing is shown most clearly in FIGS. 1 and 4). The pockets 24 are adapted to receive flexible stays 27. One end of each stay 27 is typically inserted into a protective sleeve 23 before the stay 27 is inserted into the pocket 24. The sleeve 23 prevents the edges of the stay 27 from puncturing or prematurely wearing the sheet 22. The sleeve 23 is typically much smaller than the pocket 24.

A typical curtain 28 is assembled by punching or drilling a hole 25 in one end of the stay 27 prior to inserting the stay 27 into the pocket 24. Corresponding holes 26 are also punctured through the pocket 24 and the sheet 22. The stay 27, with the sleeve 23 mounted thereon, is inserted into the pocket 24 and then manually manipulated until the hole 25 in the stay 27 and the holes 26 in the sheet 22 and pocket 24 are aligned. The stay 27 is secured to the sheet 22 and the pocket 24 by inserting a grommet 30 into the aligned holes 25, 26 and then crimping the pocket 24, stay 27 and sheet 22 together using the grommet 30.

As shown most clearly in FIG. 4, the curtain 28 is assembled to the frame 20 of the dock shelter 10 by positioning the curtain 28 between an angled section 40 and the frame 20 and then securing the angled section 40 and the curtain 28 to the frame 20 using a wood screw 41. The angled section 40 typically includes pre-punched holes 42 such that each wood screw 41 is inserted through one of the pre-punched holes 42 in the angled section 40 and then through the grommet 30 before being threaded into the frame 20.

SUMMARY OF THE INVENTION

One of the drawbacks associated with using a grommet to secure the stay to the curtain is that the spacing between the pockets on the curtain often varies due to manufacturing tolerances. Therefore, the spacing between grommets often varies slightly. The varying distances between the grommets will result in one of two scenarios.

The first scenario has adjacent grommets farther from one another than the distance between the pre-punched holes in the angled section. In this first scenario, the grommets must be manually moved closer together as the curtain and angled section are assembled to the frame. The adjacent grommets are moved closer together until two of the adjacent pre-punched holes that are in the angled section are aligned with two adjacent grommets. Once the pre-punched holes and the grommets are aligned, wood screws can be inserted through the adjacent holes in the angled section and the corresponding grommets in the curtain. Moving adjacent grommets closer together before assembling the curtain and angled section to the frame causes the curtain to bunch under the angled section as the angled section and curtain are assembled to the frame.

The second scenario has adjacent grommets closer to one another than the distance between the pre-punched holes in the angled section. In this second scenario, only one of the adjacent grommets is able to receive a wood screw because the sheet in the curtain can only be stretched so far. As a result, the angled section and curtain must either be assembled to the frame using less than an appropriate number of fasteners, or an extra hole must be drilled through the angled section at a precise location which is aligned with the grommets. An alternative but more costly solution is to acquire a replacement curtain. However, the replacement curtain may also have the same problems.

These conventional curtains are also relatively expensive and difficult to assemble. As stated previously, the stay in a conventional curtain must typically have a hole pre-punched into the end of the stay that is positioned under the angled section. In addition, the pocket and sheet must have a hole pre-punctured hole in order to be able to receive a grommet. Finally, the stay must be manually manipulated until the hole in the stay is aligned with the pre-punctured holes in the pocket and sheet so that they may be crimped together by the grommet.

The present invention alleviates one or more of the above-noted problems by providing a curtain for a dock shelter that is easily assembled and is easily assembled in combination with other components as part of a dock shelter. The curtain of the present invention is designed to ensure that each of the stays in the curtain are easily and reliably inserted into the pockets on the curtain with the stays appropriately positioned in spaced, parallel relation on the curtain.

The curtain includes a sheet, preferably a weather resistant sheet, that has a pocket mounted thereon. The pocket is adapted to receive a flexible stay and includes slits. The slits in the pocket align and maintain the stay in the appropriate position within the pocket by inhibiting movement of the stay. For example, the pocket can include two slits, and the stay can be positioned between the two slits.

In one embodiment, the pocket of the curtain is folded under itself at one end before the pocket is secured to the sheet of the curtain. In this embodiment, the pocket can include a slit that is positioned substantially near, and parallel to, the folded end of the pocket. The resiliency of the pocket material near the folded end biases the slit outward away from the sheet such that the slit serves to prevent the stay from moving past the folded end of the pocket.

In another aspect, the invention relates to a method of making a curtain. The method includes the steps of securing a pocket to a sheet, forming a slit in the pocket (e.g., by cutting the pocket), inserting a flexible stay into the pocket, and positioning the stay adjacent the slit such that the slit inhibits movement of the stay.

In yet another aspect, the invention relates to a method of making a vehicle shelter and mounting the shelter to a loading dock. The method includes the steps of mounting a frame to the loading dock, securing a pocket to a curtain, forming a slit in the pocket, inserting a stay in the pocket adjacent the slit such that the slit inhibits movement of the stay, and placing the curtain against the frame.

It should be understood that the principles of the invention outlined herein could be used for both head and side curtains, which are typically part of a dock shelter, without departing from the scope of the present invention. Other principal advantages of the invention will become apparent to those skilled in the art upon review of the following drawings, the detailed description and the attached claims.

BRIEF DESCRIPTION OF THE DRAWINGS

FIG. 2 is a partially exploded perspective view illustrating a portion of a prior art curtain.

FIG. 3 is a perspective view illustrating the portion of the prior art curtain shown in FIG. 2 with the curtain assembled.

FIG. 5 is an exploded perspective view illustrating a portion of a curtain embodying the present invention.

FIG. 6 is a perspective view of the curtain illustrated in FIG. 5 with the curtain assembled.

FIG. 7 is a section view taken along line 7—7 in FIG. 6.

FIG. 8 is an exploded perspective view illustrating a portion of a dock shelter that incorporates a curtain of the present invention.

DETAILED DESCRIPTION

Figure 1:
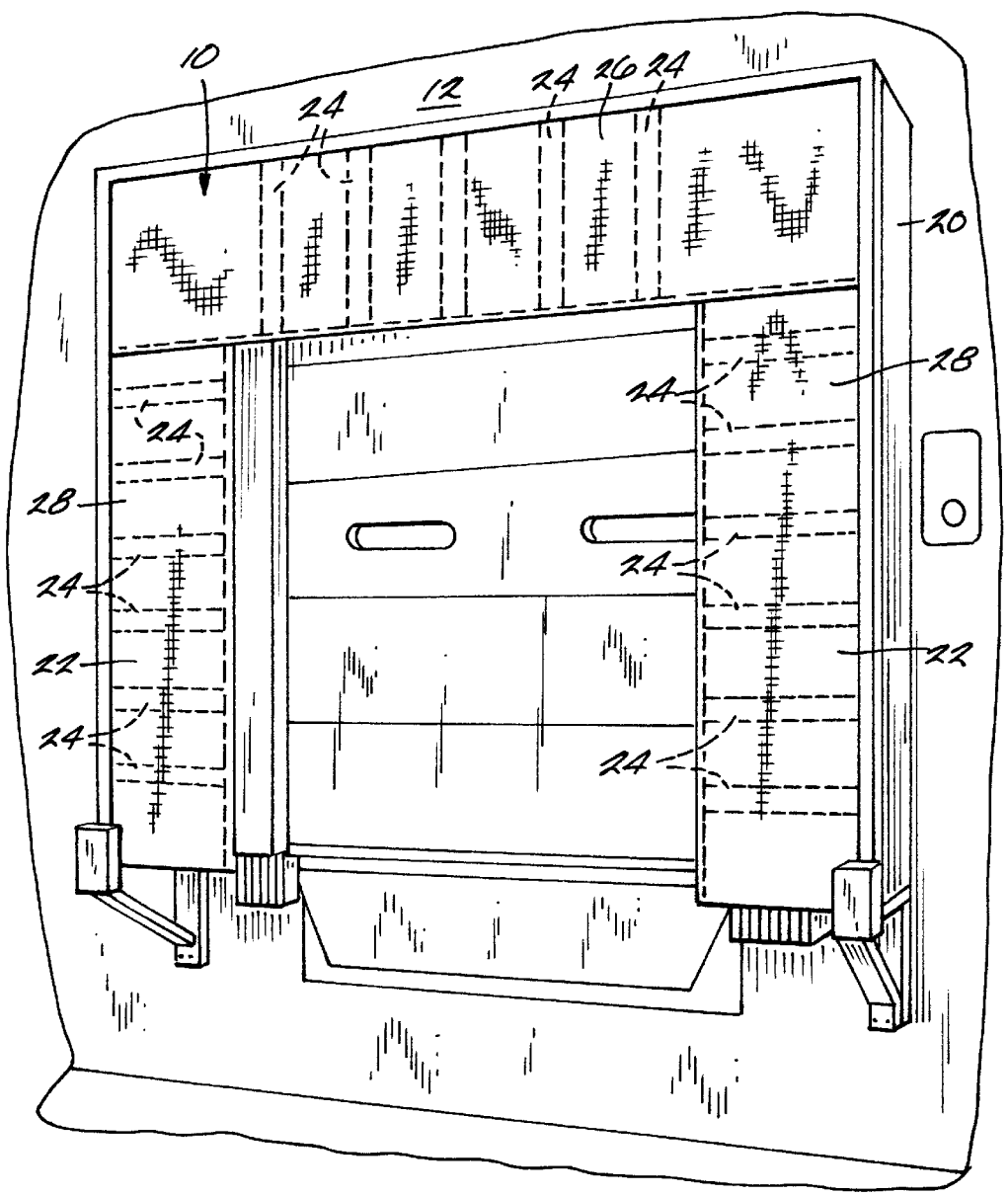
FIG. 1 is a perspective view of a vehicle shelter mounted against a loading dock.
Figure 4:
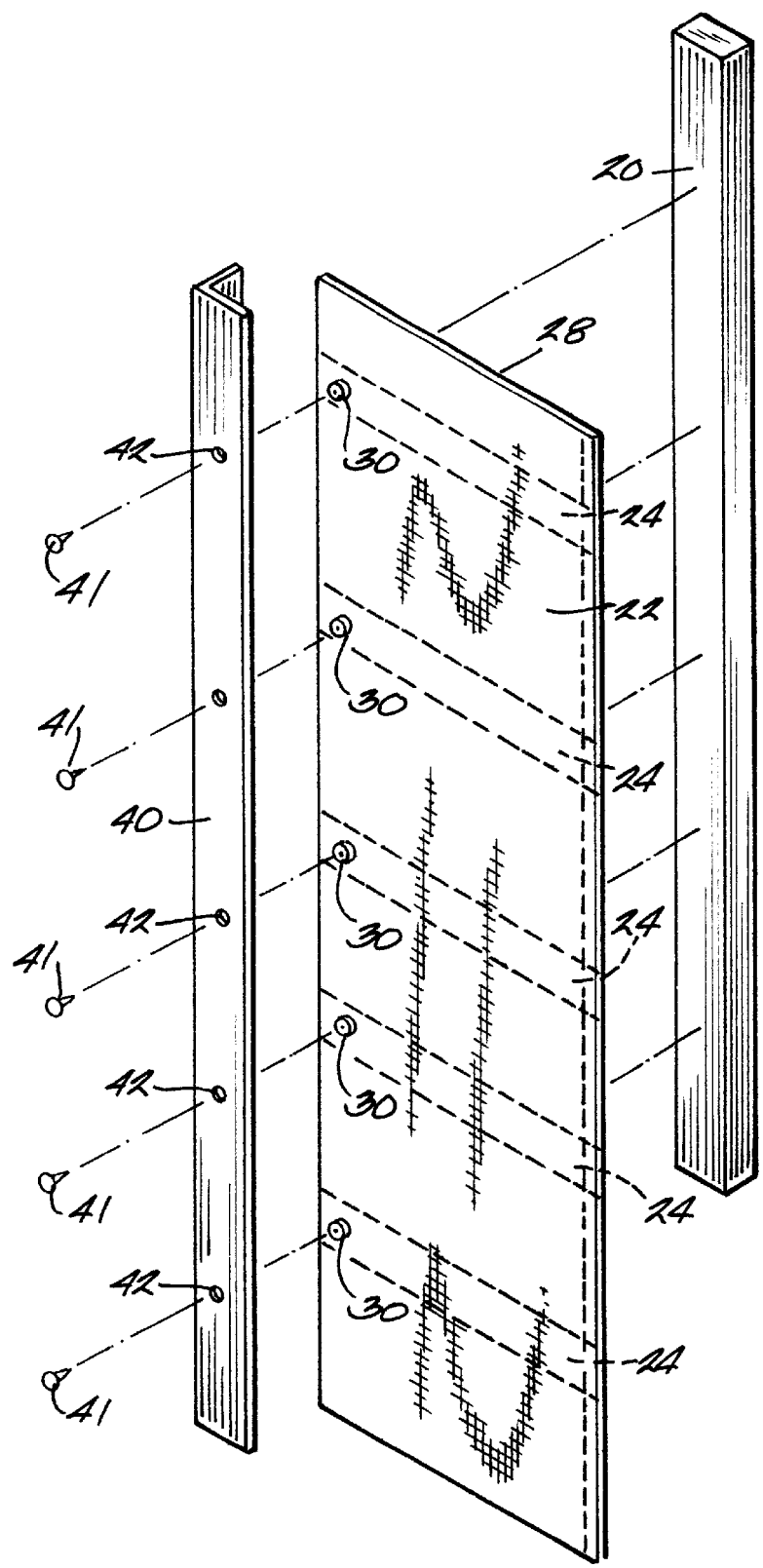
FIG. 4 is an exploded perspective view illustrating a portion of a dock shelter that includes a prior art curtain.

FIGS. 5—8 illustrate a portion of a curtain 50 embodying the present invention. The curtain 50 is used as part of dock shelter that is adapted to be mounted a loading dock. The curtain 50 includes a sheet 52, a pocket 54 secured to the sheet 52, and a stay 56 positioned within the pocket 54.

The illustrated sheet 52 is made from a weatherproof flexible fabric, such as vinyl coated polyester fabric, although Hypalon® coated nylon fabric or polyester fabric with a polymer blend coating could also be used. The sheet 52 needs to be large enough to mate with the entire side of vehicles that commonly utilize the loading dock.

The illustrated pocket 54 is made from a flexible material, such vinyl coated polyester fabric, although Hypalon® coated nylon fabric or polyester fabric with a polymer blend coating could also be used. The opposing side edges 60, 61 of the pocket 54 are secured to the backside of the sheet 52 by two parallel rows of stitching 62A, 62B. Each curtain 50 preferably includes several pockets 54 mounted in spaced, parallel relation along the sheet 52 with a corresponding number of stays 56 located within each pocket 54. In one form, one end 55 of the pocket 54 is folded under the pocket 54 before the pocket 54 is stitched to the sheet 52.

The illustrated stay 56 is made from a resilient material, such as a fiberglass composite material, although other resilient materials could also be used. The stay 56 includes a first end 57 and a second end 58. A pair of parallel slits 53 is preferably formed in the pocket 54 by cutting the pocket 54. When the stay 56 is inserted into the pocket 54, the material of the pocket 54 between the slits 53 is biased upward due to the thickness of the stay 56. The material of the pocket 54 located outside of the slits 53 and near the stitching 62A, 62B is biased to lay against the sheet 52 due to the slits 53 proximity to the stitching 62A, 62B. This difference in bias causes the sections of the pocket 54 located outside of the slits 53 to form exposed edges 63 which contact the edges of the stay 56 near the first end 57. This contact on both sides of the stay 56 locates the stay 56 midway between the parallel rows of stitching 62A, 62B. Positioning the slits 53 in this manner makes certain that an individual assembling a dock shelter will be able to properly position a fastener (e.g., a self-drilling screw 71) relative to the stay 56 even though the stay 56 is not visible. The proper position of the fastener is maintained because the individual assembling the dock shelter simply has to position the fastener midway between the rows of stitching 62A, 62B on the curtain 50.

The second end 58 of the stay 56 preferably has a sleeve 59 mounted thereon. The sleeve 59 is used to protect the sheet 52 from damage by the edges of the stay 56 as the stay is inserted into the pocket 54. The sleeve 59 is preferably sized to substantially match the area within the pocket such that the sleeve serves to inhibit movement of the stay 56 once the stay 56 is positioned within the pocket 54.

In another embodiment of the invention, an additional slit 65 is cut into the pocket 54 near the folded end 55 of the pocket 54. The slit 65 extends substantially parallel to the folded end 55 and is located near the edge of the curtain 50. The slit 65 provides an opening for inserting the stay 56 into the pocket 54 and is biased upward because of the resiliency of the pocket material near the folded end 55. Once the stay 56 is inserted into the pocket 54, the slit 65 serves to prevent the first end 57 of the stay 56 from moving past the edge of the curtain 50 during shipment or installation of the curtain 50 to the frame 70.

Referring now particularly to FIG. 7, the curtain 50 is assembled to the frame 70 of a dock shelter by positioning the curtain 50 between an angled section 69 and the frame 70 and then securing the angled section 69 and the curtain 50 to the frame 70 using a fastener, preferably a self-drilling screw 71. The angled section 69 preferably includes a longitudinal groove 72 for aligning the lateral position of the screw. An individual assembling the dock shelter simply positions each screw 71 within the longitudinal groove 72 of the angled section 69 at a point midway between each parallel rows of stitches 62A, 62B. The angled section 69 and the curtain 50 are secured to the frame 70 by threading the screw 71 through the angled section 69 and the sheet 52, pocket 54 and stay 56 of the curtain 50 before the screw 71 enters the frame 70.

The foregoing description of the present invention has been presented for purposes of illustration and description. Furthermore, the description is not intended to limit the invention to the form disclosed herein. It should be noted that the same principles that are described herein could apply to either a head curtain or a side curtain without departing from the scope of the present invention. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A curtain for a vehicle shelter adapted to be mounted to a loading dock, said curtain comprising:

a sheet;

a pocket mounted on said sheet, wherein said pocket includes an end that is folded under said pocket against said sheet before said pocket is secured to said sheet, and wherein said pocket includes a slit that extends substantially parallel to said folded end of said pocket; and a stay positioned in said pocket, wherein said slit is located near said folded end of said pocket such that a portion of said pocket adjacent said slit biases outward from said sheet to inhibit movement of said stay past said slit once said stay is inserted into said pocket.

2. The curtain of claim 1 further comprising at least one additional pocket coupled to said sheet and an additional stay secured within each additional pocket.

3. The curtain of claim 1 further comprising a sleeve mounted on an end of said stay, said sleeve being positioned within said pocket, wherein said sleeve is sized to inhibit movement of said stay within said pocket.

4. The curtain of claim 1 wherein said pocket is formed by securing opposing side edges on said pocket to said sheet.

5. A method of making a curtain comprising the steps of:

folding one end of a pocket under the pocket against a sheet and securing the pocket to the sheet;

forming at least two slits in the pocket;

inserting a stay into the pocket by positioning the stay between and adjacent the two slits such that the slits inhibit movement of the stay; and prior to inserting the stay into the pocket, forming a further slit in the pocket near, and substantially parallel to, the folded end of the pocket such that the further slit inhibits the stay from moving past the further slit once the stay is inserted into the pocket.

6. The method of making a curtain as claimed in claim 5 wherein said step of securing the pocket to the sheet further includes the steps of:

placing the pocket against the sheet; and securing opposing edges of the pocket to the sheet.

7. The method of making a curtain as claimed in claim 5 further comprising the step of inserting one end of the stay into a sleeve prior to said step of inserting the stay into the pocket.

8. The method of making a curtain as claimed in claim 5 wherein said steps of forming the slits in the pocket are done by cutting the slits into the pocket.

* * * * *